United States Patent
Schmidt

(10) Patent No.: US 9,523,389 B2
(45) Date of Patent: Dec. 20, 2016

(54) ROLLING BEARING FOR A TURBOCHARGER

(71) Applicant: Schaeffler Technologies GmbH & Co. KG, Herzogenaurach (DE)

(72) Inventor: Heiko Schmidt, Muhlhausen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 66 days.

(21) Appl. No.: 14/413,852

(22) PCT Filed: May 28, 2013

(86) PCT No.: PCT/EP2013/060903
§ 371 (c)(1),
(2) Date: Jan. 9, 2015

(87) PCT Pub. No.: WO2014/009050
PCT Pub. Date: Jan. 16, 2014

(65) Prior Publication Data
US 2015/0192176 A1   Jul. 9, 2015

(30) Foreign Application Priority Data
Jul. 9, 2012 (DE) .................. 10 2012 211 891

(51) Int. Cl.
*F16C 19/00* (2006.01)
*F16C 33/66* (2006.01)
(Continued)

(52) U.S. Cl.
CPC .......... *F16C 33/6681* (2013.01); *F01D 25/16* (2013.01); *F01D 25/18* (2013.01); *F16C 19/184* (2013.01);
(Continued)

(58) Field of Classification Search
CPC ....... F16C 191/84; F16C 27/045; F16C 33/38; F16C 33/3806; F16C 33/3842; F16C 33/3868; F16C 33/3875; F16C 33/583; F16C 33/6659; F16C 33/6681; F16C 2360/24; F01D 25/16; F01D 25/18; F02C 7/06
See application file for complete search history.

(56) References Cited

U.S. PATENT DOCUMENTS 3,649,093 A * 3/1972 Muratore ............ F16C 33/3806
                                                    384/463
4,345,799 A    8/1982 Crofts
(Continued)

FOREIGN PATENT DOCUMENTS

CN    101672326 A    3/2010
CN    102168718 A    8/2011
(Continued)

*Primary Examiner* — James Pilkington
(74) *Attorney, Agent, or Firm* — Volpe and Koenig, P.C.

(57) ABSTRACT

A rolling bearing (6), in particular for a turbocharger, having an outer ring (10), an inner ring (11) which is rotatable relative to the outer ring (10) about an axis of rotation (14), and having a number of rolling bodies (19) which are guided in a cage (24) between the outer ring (10) and the inner ring (11). Here, the cage (24) has, on its inner circumference, a guide surface (25) which is guided on a guide track (26) on the outer circumference of the inner ring (11). A groove (32) with a free region (34) extends on the outer circumference of the inner ring (11). The groove (32) includes a groove base (33) which rises in a radial direction toward the guide surface (25). Oil is applied to the free region (34) of the groove (32) via a spray oil hole (22) in the outer ring (10).

9 Claims, 5 Drawing Sheets

(51) Int. Cl.
*F16C 33/38* (2006.01)
*F01D 25/16* (2006.01)
*F01D 25/18* (2006.01)
*F16C 19/18* (2006.01)
*F16C 33/58* (2006.01)
*F16C 27/04* (2006.01)

(52) U.S. Cl.
CPC ....... *F16C 33/3806* (2013.01); *F16C 33/3843* (2013.01); *F16C 33/583* (2013.01); *F16C 33/6659* (2013.01); *F05D 2220/40* (2013.01); *F16C 27/045* (2013.01)

(56) References Cited

U.S. PATENT DOCUMENTS

| | | | |
|---|---|---|---|
| 5,026,179 A | 6/1991 | Ito | |
| 5,028,150 A | 7/1991 | Kronenberger et al. | |
| 5,102,242 A * | 4/1992 | Hussblein | F16C 33/3806 |
| | | | 384/516 |
| 5,603,602 A | 2/1997 | Romani | |
| 8,118,544 B2 * | 2/2012 | Arnold | F16C 19/184 |
| | | | 415/156 |
| 8,485,730 B2 * | 7/2013 | Morishita | F16C 33/3806 |
| | | | 384/492 |
| 2008/0019629 A1 | 1/2008 | McKeiman | |
| 2008/0267548 A1 * | 10/2008 | Chriss | F01D 25/16 |
| | | | 384/492 |
| 2011/0236193 A1 * | 9/2011 | Chriss | F04D 25/04 |
| | | | 384/467 |
| 2012/0051906 A1 | 3/2012 | House et al. | |

FOREIGN PATENT DOCUMENTS

| | | |
|---|---|---|
| CN | 203506894 U | 4/2014 |
| DE | 3825326 A1 | 2/1990 |
| DE | 4008347 A1 | 9/1990 |
| DE | 19521855 A1 | 1/1996 |
| DE | 102006014108 A1 | 9/2007 |
| DE | 102007013727 A1 | 11/2008 |
| DE | 102010035785 | 3/2012 |
| DE | 112010001913 T5 | 6/2012 |
| EP | 2189673 A2 | 5/2010 |
| JP | H09151946 | 6/1997 |
| JP | 2010090915 | 4/2010 |
| WO | 2010133542 | 11/2010 |
| WO | 2011009813 | 1/2011 |
| WO | 2012079879 | 6/2012 |

* cited by examiner

ROLLING BEARING FOR A TURBOCHARGER

FIELD OF THE INVENTION

The invention relates to a rolling bearing, in particular for a turbocharger, comprising an outer ring, an inner ring that can rotate relative to the outer ring about an axis of rotation, and a number of rolling bodies that are guided in a cage between the outer ring and the inner ring. The invention further relates to a bearing unit for a turbocharger that is equipped with such a rolling bearing.

BACKGROUND

A rolling bearing of the type noted above is known, for example, from WO 2010/133542 A1. The rolling bearing that is suitable for a turbocharger is constructed as an angular contact ball bearing. The balls are guided in a cage. The cage itself is guided with a guide surface on the inner circumference of the outer ring. On the side turned away from the guide surface, the cage has a radial extension to prevent the lubricating agent from flowing through the rolling bearing.

SUMMARY

The invention is based on the objective of providing a rolling bearing of the type noted above that is suitable, in particular, for supporting the shaft of a turbocharger and, in this respect, exhibits very low wear at high rotational speeds. The invention is further based on the objective of providing a bearing unit for a turbocharger that exhibits a very low tendency for wear.

The objective mentioned first is solved by a rolling bearing with one or more of the features described herein. Accordingly a cage is provided that has, on its inner circumference, a guide surface that is guided on a guide track on the outer circumference of the inner ring. Furthermore, a groove with a free region extends on the outer circumference of the inner ring, wherein this groove comprises a groove base that rises in the radial direction toward the guide surface and a spray oil hole that is directed toward the free region of the groove is formed in the outer ring.

The invention starts in a first step from the idea that, in a rolling bearing for a turbocharger, the inner ring is driven by means of the shaft at high rotational speeds. If the cage is guided on the outer ring in accordance with the known state of the art, then the corresponding braking torque acts on the set of rolling bodies, boosted by the given lever properties. The resulting contact force between the rolling bodies and the cage causes an additional friction moment on the rolling motion of the rolling bodies. The increased frictional resistance produced in this way reduces the speed of the set of rolling bodies especially for a non-biased support, for example, for a double-row angular contact ball bearing on the side facing away from the axial load. Due to the centrifugal force in connection with the bearing play, the rolling bodies are not continuously in contact with the inner ring and are thus not driven continuously. For temporary contact events between the inner ring and the rolling bodies, slippage damage on the raceway and on the rolling bodies can be produced due to the high relative speed.

In a second step, the invention starts from the knowledge that the problem of slippage damage caused, in particular, by the high rotational speeds can be solved in that the cage is guided on the inner ring. For this purpose, the cage has, on its inner circumference, a guide surface by means of which a guide is formed with a corresponding guide track on the outer circumference of the inner ring. Due to the reduced friction radius in comparison with a guide on the outer ring, the friction moment is directly reduced. The friction moment introduced into the cage now has a driving effect on the set of rolling bodies.

By guiding the cage on the inner ring, the gap height between the cage and the inner ring is further reduced, which can prevent pump losses through increased introduction of lubricant.

By providing the spray oil hole, during operation the circumferential groove is supplied with lubricant, especially with oil. Due to the centrifugal force, the lubricant is driven by the rising groove base into the region between the guide surface and guide track.

If the cage is guided on a bearing ring of the rolling bearing, then, in the sense of the present invention, a guide region is provided such that the radial distance between the cage and the corresponding bearing ring is smaller there than an otherwise radial gap dimension of the cage relative to one of the bearing rings. Accordingly, in the present case, the radial distance of the cage to one bearing ring is larger at each point than the distance between the guide surface of the cage and the guide track on the outer circumference of the inner ring. In particular, outside of the guide surface or the guide track, the cage is at a greater distance from the inner ring than the guide surface relative to the guide track.

In one preferred construction, the cage has a tab that is at a distance in the axial direction from the guide surface and extends in the radial direction against the outer circumference of the inner ring. During operation, such a tab collects lubricant released by centrifugal force from the outer circumference of the inner ring, and especially from the groove, so that this lubricant is available for lubricating the guide region, that is, the region between the guide surface and guide track. In particular, the inner diameter of the cage in the region of the guide surface is larger than the inner diameter of the cage in the region of the tab, so that for correspondingly high rotational speeds due to centrifugal force, the lubricant is driven toward the region between the guide surface and guide track.

It is further preferred that a radial lubricating gap is formed overall between the guide surface of the cage and the guide track of the inner ring. The radial gap dimension in the lubricating gap advantageously equals between 0.05 mm and 0.2 mm depending on the embodiment. During operation, the cage centers itself on the inner ring through the lubricant penetrating into the lubricating gap.

It is further preferred that the cage has, in the axial direction, a diameter step to a larger diameter at a distance from the guide surface. This construction allows, in the circumferential direction, a central contacting of the rolling bodies with the edge of a cage pocket hole. On the axial end of the cage facing away from the guide surface, this remains at a distance, in particular, from the outer circumference of the inner ring.

In another construction, the cage comprises, on its inner circumference, another guide surface that is guided on another guide track on the outer circumference of the inner ring, wherein the rolling bodies are arranged in the axial direction between the two guide surfaces. In other words, the cage is guided on the inner ring at two points at a distance from each other in the axial direction. This improves the tilting stability of the cage. By reducing the tilting angle that is possible for the cage, the risk of breaking the lubricating film during operation is reduced. Edge wear due to solid body contact is prevented.

To achieve a central contacting of the rolling bodies at the edge of the cage pocket hole in the circumferential direction, especially for a double guidance of the cage at a distance in the axial direction on the inner ring, the cage preferably has an increased diameter in the region of the rolling bodies.

In one advantageous construction, the rolling bearing is formed as an angular contact ball bearing. Through a double-row angular contact ball bearing, an axial fixed bearing can be formed that receives both axial and also radial force components.

The rolling bearing is preferably constructed such that the guide surface or the guide track and/or the tabs are arranged on the inside in the axial direction with the associated groove on the inner ring with respect to the rolling bodies. Here, lubricant flows in the axial direction from the inside to the outside while lubricating the set of rolling bodies. The lubricant emerges again at the axially outer end side of the rolling bearing.

The problem mentioned second is solved by a bearing unit for a turbocharger with one or more of the features described herein. This unit comprises a bearing housing extending in the axial direction with a passage hole and a rolling bearing arranged coaxially inside the passage hole. The rolling bearing here comprises a cage that has, on its inner circumference, a guide surface that is guided on a guide track on the outer circumference of the inner ring. In one preferred construction, it is especially provided to construct the rolling bearing in two rows and to split the inner ring in the axial direction.

Additional embodiments of the bearing unit result from the refinements described above for the rolling bearing. Here, the advantages specified for the rolling bearing can be transferred to the bearing unit.

Especially for a two-row construction of the rolling bearing, the inner ring is split in two in the axial direction. In this way, each set of rolling bodies can be mounted on the inner ring. The cage has the reduced radius on the guide surface on the inner side in the axial direction.

BRIEF DESCRIPTION OF THE DRAWINGS

Embodiments of the invention will be explained in more detail using a drawing. Shown herein are.

DETAILED DESCRIPTION OF THE PREFERRED EMBODIMENTS

Figure 1:
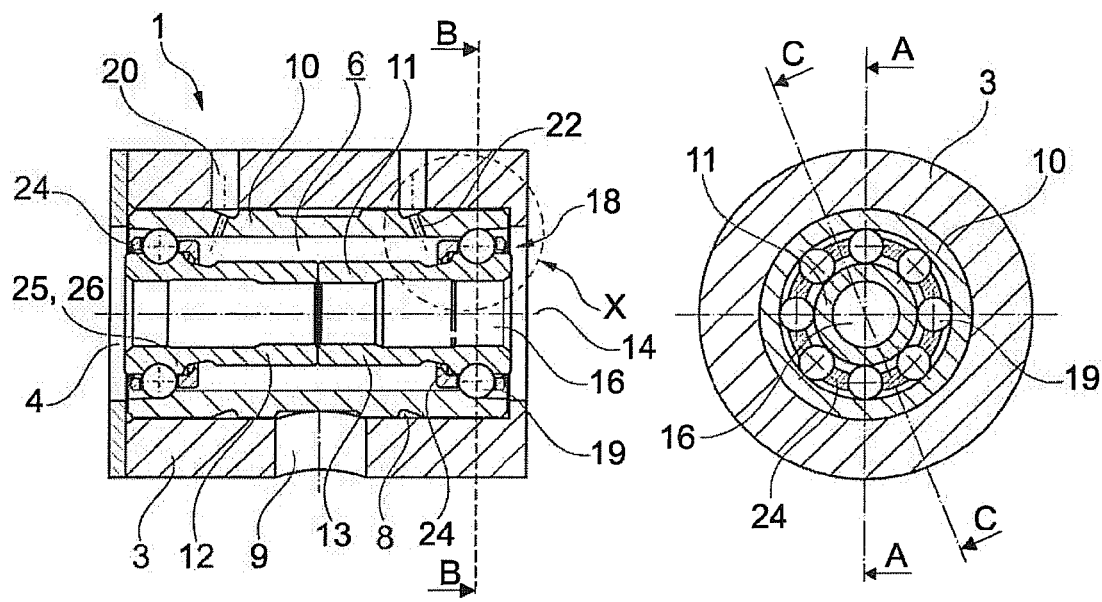
FIG. 1: in a longitudinal section and in a cross section, a bearing unit for a turbocharger with a rolling bearing in a first embodiment.

In FIG. 1, a bearing unit 1 for a turbocharger is shown in a longitudinal section and in a cross section. The bearing unit 1 comprises a bearing housing 3 with a passage hole 4 in which is arranged a rolling bearing 6 for the rotatable support of the shaft of the turbocharger. For vibration damping, during operation a squeeze oil film 8 that is supplied from an oil hole 9 is formed between the rolling bearing 6 and the bearing housing 3.

The rolling bearing 6 comprises an outer ring 10 and an inner ring 11 that is split in the axial direction in a first inner ring 12 and in a second inner ring 13. The inner ring 11 is supported so that it can rotate about an axis of rotation 14 relative to the outer ring 10. The not-drawn shaft of the turbocharger is held in a central hole 16 of the inner ring 11.

The rolling bearing 6 as such is formed as a double-row angular contact ball bearing 18. For this purpose, on both axial ends of the rolling bearing 6 there is a set of rolling bodies each with balls 19 guided in a cage 24 as rolling bodies. Two spray oil holes 22 in the outer ring 10 are supplied via two supply holes 20 in the bearing housing 3. The oil lubricant reaches into the interior of the rolling bearing 6 via the spray oil holes 22.

The cages 24 are each formed with ring shapes. The cages 24 are each guided on the inside in the axial direction on a guide track 26 of the inner ring 11 by means of a guide surface 25. At this position, the radial distance of the cage 24 is at a minimum relative to the other gap measures for the bearing ring 11 or 10.

Figure 2:
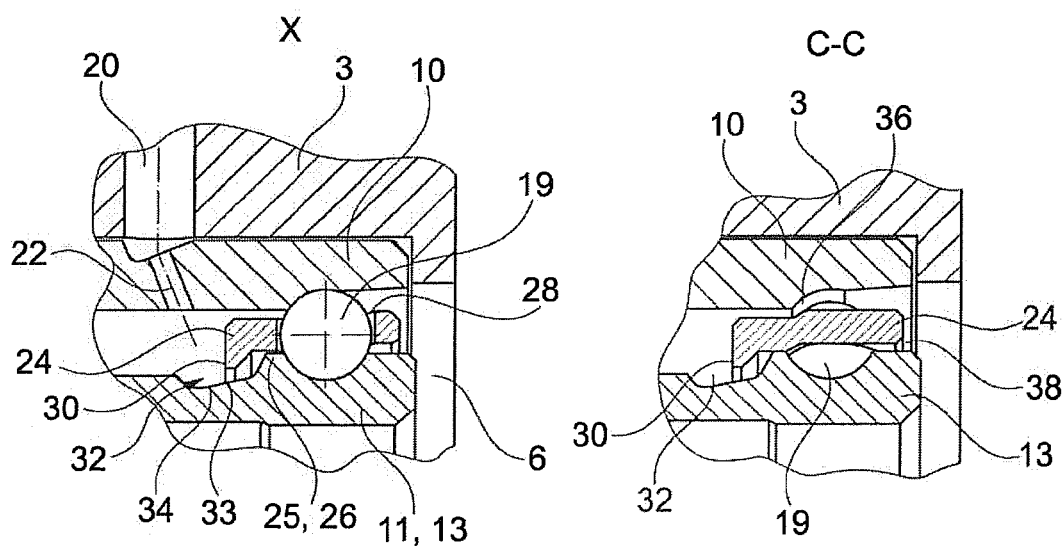
FIG. 2: in two different longitudinal sections, each a detailed view of the rolling bearing according to FIG. 1, FIG. 3: in two different longitudinal sections, each a detailed view of a rolling bearing in a second embodiment.

In FIG. 2, detailed views of the rolling bearing 6 used in the bearing unit 1 according to FIG. 1 are shown in two different longitudinal sections. The detailed view on the left in FIG. 2 corresponds to an enlargement of the marked area X. The detailed view on the right shows the same axial position, wherein, however, the longitudinal section corresponding to FIG. 1, on the right, C-C, is turned farther toward a position between two rolling bodies 19.

From the detailed views corresponding to FIG. 2 it is clear that the cage 24 comprises, on its axially inner side, a tab that extends inward in the radial direction and projects into a groove 32 on the outer circumference of the inner ring 11 or the split ring 13. For the cage 24, a cage pocket 28 can also be seen in which a ball 19 is held as the rolling body. In the detailed view X on the left, in particular, the groove base 33 of the groove 32 can be seen that rises in the radial direction toward the guide surface 25 of the cage 24. The groove 32 extends with a free region 34 inward in the axial direction beyond the cage 24. The spray oil hole 22 formed in the outer ring 10 is directed toward the free region 34 of the groove 32. During operation, lubricant held in the groove 32 is moved by centrifugal force along the rising groove base 33 toward the guide surface 25 or toward the guide track 26. Lubricant flung out of the groove 32 due to centrifugal force is collected by the tab 30 and guided, in turn, to the guide surface 25 or to the guide track 26, that is, to the guide region.

Corresponding to the detailed view C-C on the right according to FIG. 2, the cage 24 in the axial direction has a diameter step 36 to a larger diameter. With the illustrated embodiment it is achieved that the balls 19 in the cage pocket 28 contact the center of the edge of the cage 24 in the circumferential direction, as can be seen in FIG. 1 in the cross section shown on the right. On the axially outer end of the cage 24, there is a radial gap 38 toward the outer circumference of the inner ring 11 or 13. There, the cage 24 is not guided on the inner ring 11.

Figure 3:
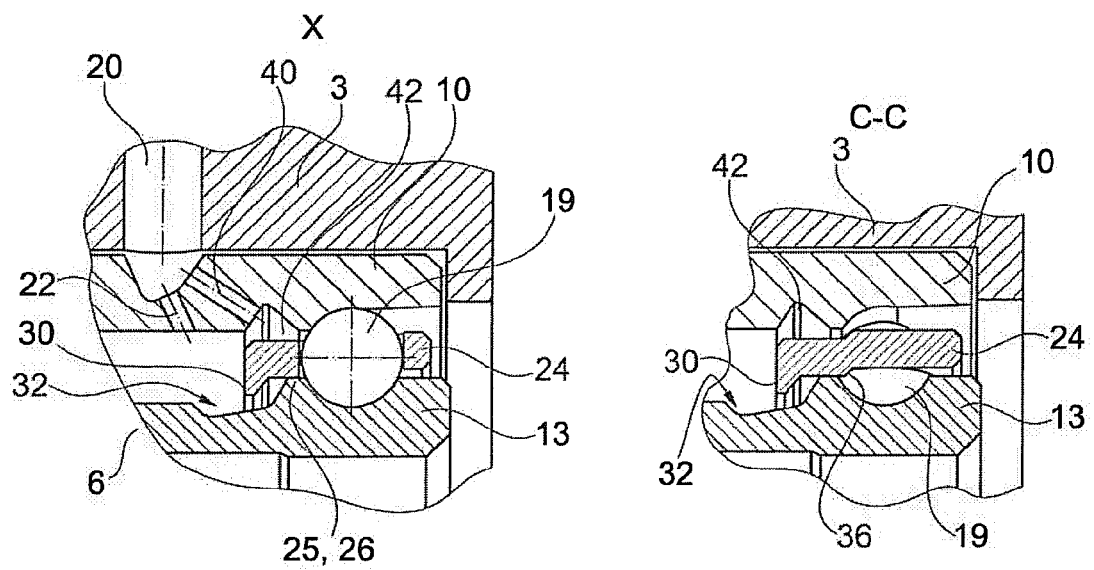

In the detailed views corresponding to FIG. 3, a rolling bearing 6 is shown in a second embodiment. This rolling bearing 6 differs from the rolling bearing 6 corresponding to FIGS. 1, 2 in that another spray oil hole 40 is formed in the outer ring 10. This spray oil hole 40 opens in a circumferential ring groove 42 on the outer ring 10. The lubricant is brought directly to the balls 19 through the ring groove 42. It does not have to pass through the tight cage guidance gap between the guide surface 25 and the guide track 26.

Figure 4:
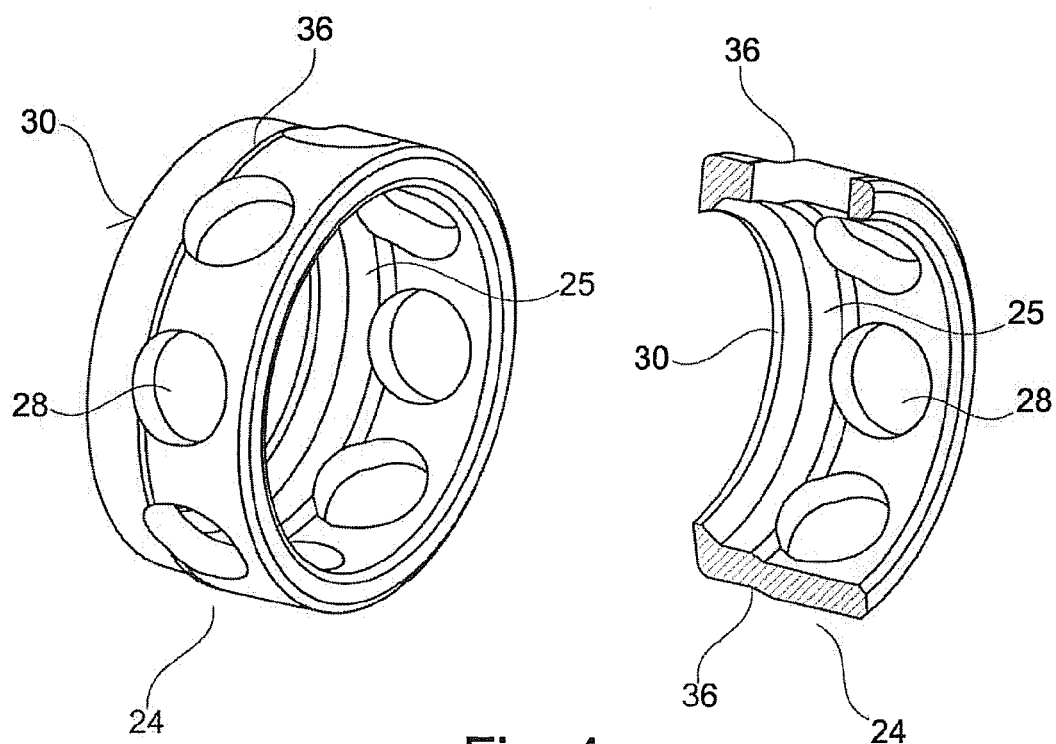
FIG. 4: in a perspective and partially cut-away view, a cage for a rolling bearing corresponding to FIG. 2 or 3, FIG. 5: in two different longitudinal sections, each a detailed view of a rolling bearing in a third embodiment.

From FIG. 4, the cage 24 can be seen and how it is used in the rolling bearing 6 corresponding to FIGS. 1 to 3. On its inner side, the guide surface 25 can be seen. In the circumferential direction of the cage 24, several cage pockets 28 are formed for holding the balls 19. The cage pockets 28 are each formed as holes. On the axially inner side of the cage 24, the tab 30 is formed. The diameter step 36 is in the region of the cage pockets 28.

Figure 5:
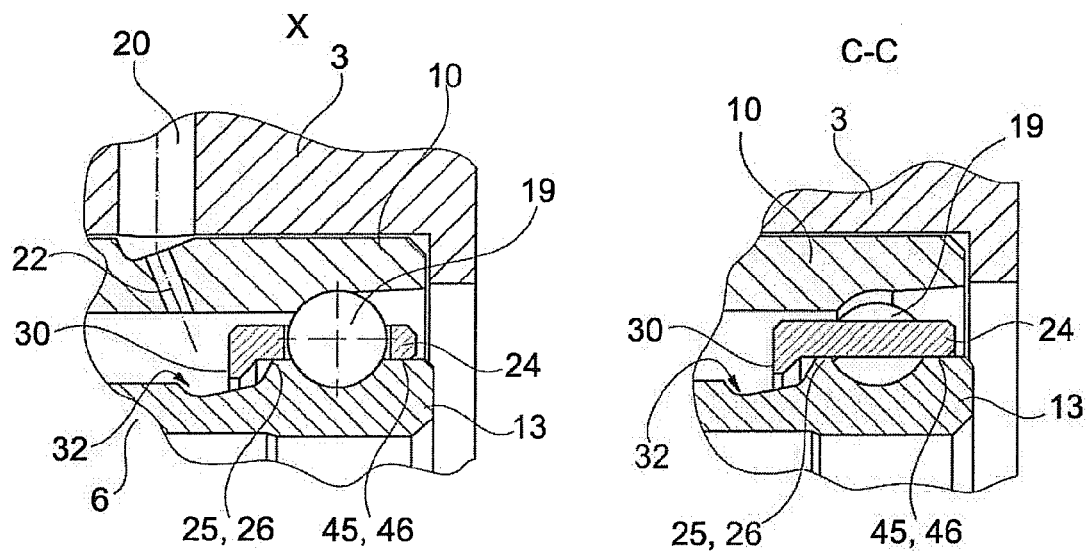

In the detailed views corresponding to FIG. 5, a rolling bearing 6 according to a third embodiment is shown. Here, the bearing rings 10, 11 have an identical design relative to the rolling bearing 6 corresponding to the first embodiment according to FIGS. 1, 2. The cage 24 differs from the cage 24 according to FIG. 2 in that the diameter step 36 is eliminated. For this reason, the cage 24 corresponding to FIG. 5 has, on its outer axial end, another guide surface 45 that is guided on another guide track 46 of the inner ring 13. The radial distance of the cage 24 relative to the inner ring 13 or 11 is at a minimum in the region of the guide surfaces 25, 45 or the guide tracks 26, 46. The radial distance of the cage 24 to the outer ring 10 is here noticeably larger.

The cage 24 corresponding to FIG. 5 has a double guide design with spacing in the axial direction. This increases the tilting stability of the cage 24. By limiting tilting of the cage 24, any resulting material damage due to solid body contact is reduced.

Figure 6:
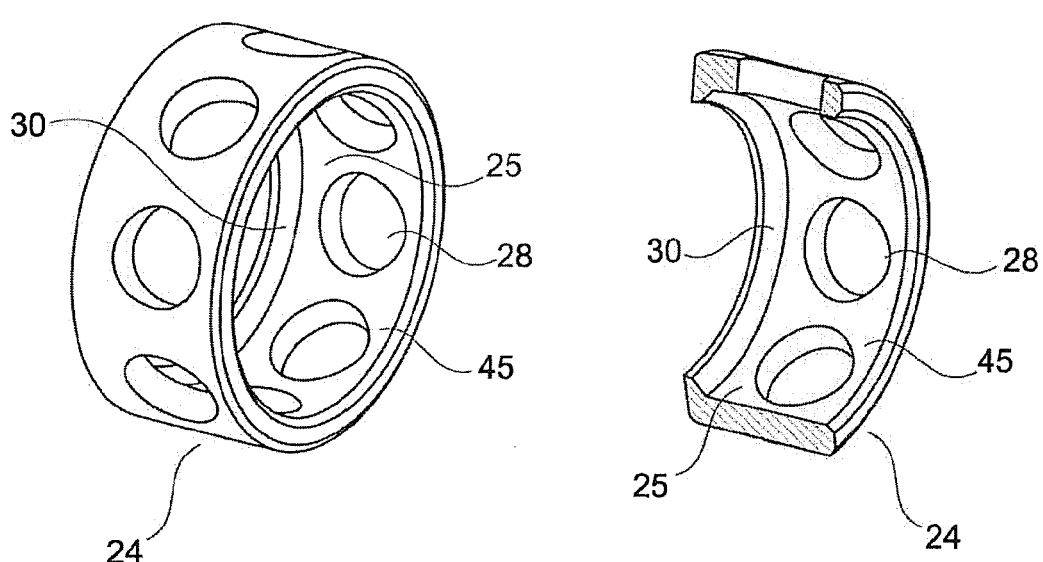
FIG. 6: in a perspective and partially cut-away view, a cage for a rolling bearing corresponding to FIG. 5, FIG. 7: in a longitudinal section and in a cross section, a bearing unit for a turbocharger with a rolling bearing in a fourth embodiment.

From FIG. 6 the cage 24 can be seen and how it is used in the rolling bearing 6 corresponding to FIG. 5. On the inner side of the cage 24, the running surfaces 25 and 45 can be seen. On the axially inner end of the cage 24, a tab 30 is formed, in turn, for improving the lubricant supply.

Figure 7:
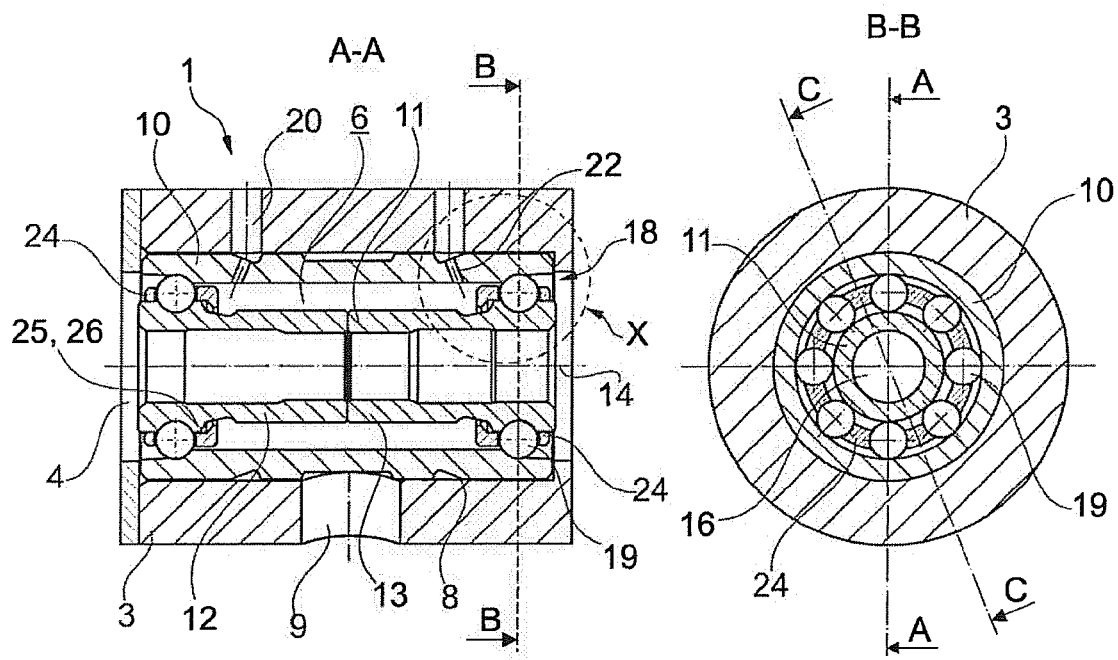
Figure 8:
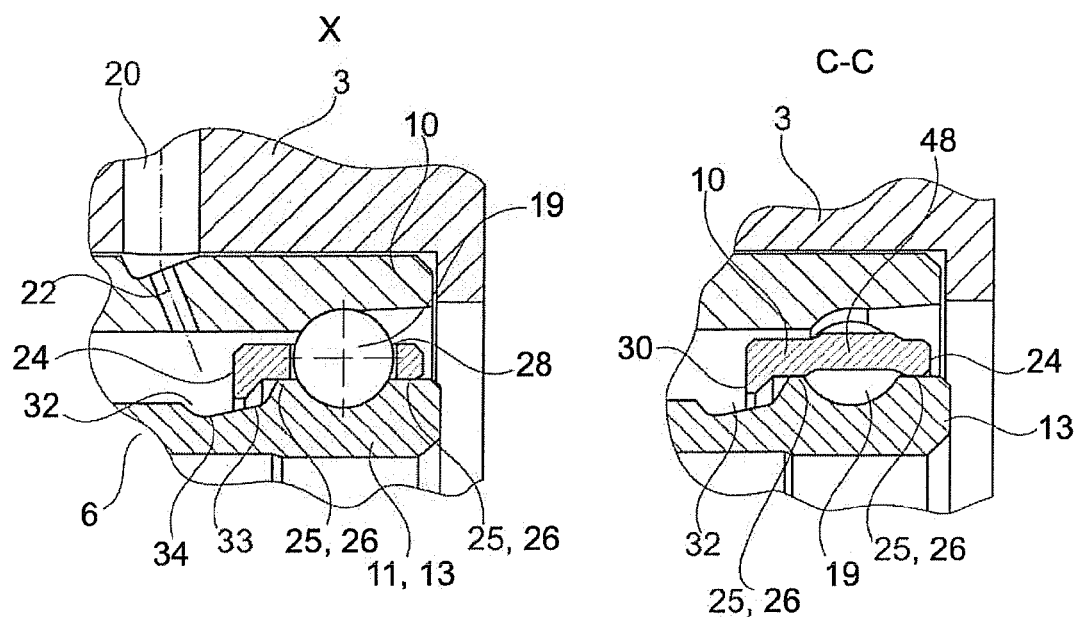
FIG. 8: in two different longitudinal sections, each a detailed view of the rolling bearing corresponding to FIG. 7, FIG. 9: in a perspective and partially cut-away view, a cage for the rolling bearing corresponding to FIG. 8, and FIG. 10: an enlarged detailed view of the cage corresponding to FIG. 2.

From FIGS. 7 and 8, a rolling bearing 6 according to a fourth embodiment can be seen. Here, the outer ring 10 and the inner ring 11 have identical designs relative to the rolling bearing 6 corresponding to FIGS. 1, 2. The cage 24 is now formed, in contrast, with an area of larger diameter 48 in the region of the balls 19. The cage 24 corresponding to FIGS. 7, 8 has two guide surfaces 25, 45 that are at a distance in the axial direction and are guided, corresponding to the cage 24 according to FIGS. 5, 6, on guide tracks 26, 46 of the inner ring 13.

Figure 9:
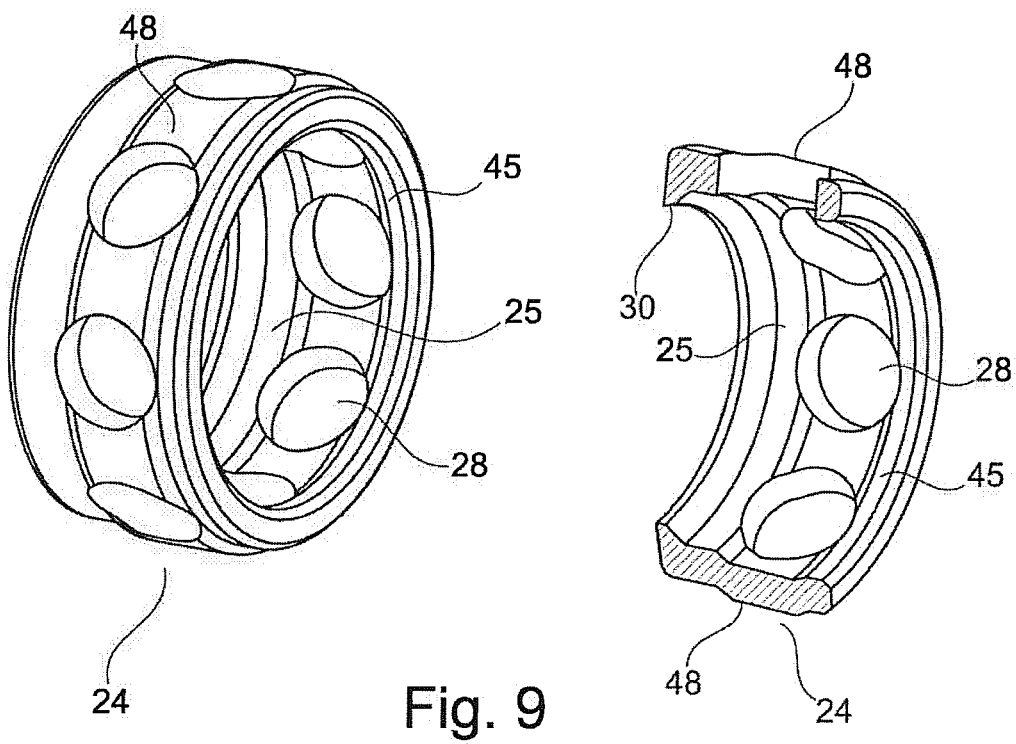

In FIG. 9, the cage 24 is shown and how it is used in a rolling bearing 6 corresponding to FIGS. 7, 8. The axially inner tab 30 and the two guide surfaces 25 and 45 can be easily seen. The region of greater diameter 48 is visible in the region of the cage pockets 28.

Figure 10:
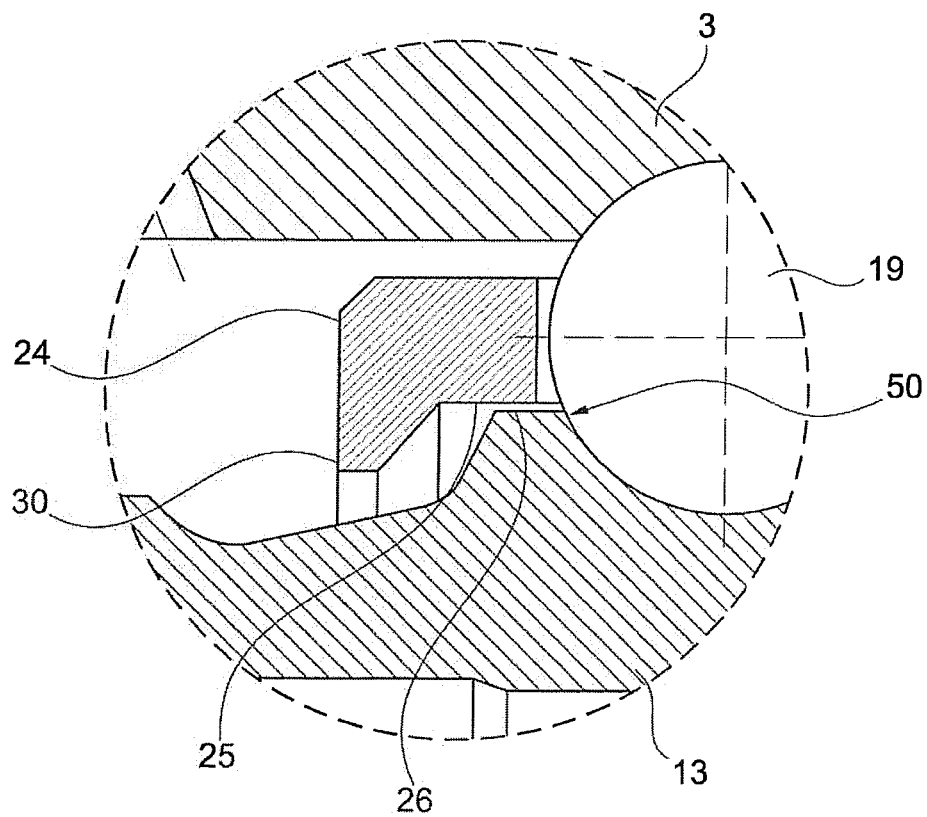

In FIG. 10, in another enlarged view, the detail X corresponding to FIG. 1 is shown. One clearly sees that, in the guide region between the guide surface 25 of the cage 24 and the guide track 26 of the inner ring 13, a narrow lubricating oil gap 50 is formed, in which and through which oil is forced as a lubricant due to centrifugal force during operation. In this way, the guide region of the cage 24 on the inner ring 11 or 13 is lubricated. The cage 24 is centered on the inner ring 11 or 13. Through the lubricating oil gap 50, oil reaches farther into the contact region between the balls 19 and the cage 24, so that lubrication is also ensured in this way.

LIST OF REFERENCE NUMBERS

1 Bearing unit
3 Bearing housing
4 Passage hole
6 Rolling bearing
8 Squeeze oil film
9 Oil hole
10 Outer ring
11 Inner ring
12 First inner ring
13 Second inner ring
14 Axis of rotation
16 Central hole
18 Angular contact ball bearing, double-row
19 Rolling bodies (balls)
20 Supply hole
22 Spray oil hole
24 Cage
25 Guide surface
26 Guide track
28 Cage pocket
30 Tab
32 Groove
33 Groove base
34 Free region
36 Diameter step
38 Radial gap
40 Spray oil hole
42 Ring groove
45 Guide surface
46 Guide track
48 Region of larger diameter
50 Lubrication oil gap

The invention claimed is:

1. A roller bearing comprising:
an outer ring including a spray oil hole,
an inner ring rotatable relative to the outer ring about an axis of rotation, and including a groove with a free region that extends on an outer circumference of the inner ring and a guide track on the outer circumference,
a cage including, on an inner circumference thereof, a guide surface that is guided on the guide track on the inner ring, and
a number of rolling bodies that are guided in the cage between the outer ring and the inner ring,
wherein the groove of the inner ring includes a groove base that rises in a radial direction toward the guide surface of the cage, and the spray oil hole of the outer ring is directed toward the free region of the groove of the inner ring, and the cage includes a tab positioned at a distance in an axial direction from the guide surface that extends radially inwardly into the groove of the inner ring.

2. The rolling bearing according to claim 1, wherein a radial lubrication gap is formed between an axially outer end of the cage and the inner ring.

3. The rolling bearing according to claim 1, wherein the cage comprises, in an axial direction, a diameter step to a larger diameter at a distance from the guide surface.

4. The rolling bearing according to claim 3, wherein the diameter step is formed in a region of cage pockets and the rolling bodies contact an edge of the cage pockets centrally in a circumferential direction.

5. The rolling bearing according to claim 1, wherein the cage has an increased diameter in a region of the rolling bodies.

6. The rolling bearing according to claim 1, wherein the bearing is as an angular contact ball bearing.

7. A bearing unit for a turbocharger, comprising:
a bearing housing that extends in an axial direction with a passage hole, and a rolling bearing arranged coaxially within the passage hole, the rolling bearing including
an outer ring including a spray oil hole,
an inner ring that is rotatable relative to the outer ring about an axis of rotation and includes a guide track on an outer circumference, and a groove with a free region extends on the outer circumference of the inner ring,
a cage including, on an inner circumference thereof, a guide surface that is guided on the guide track of the inner ring, and
a number of rolling bodies guided in the cage between the outer ring and the inner ring
wherein the groove of the inner ring includes a groove base that rises in a radial direction toward the guide surface of the cage, the spray oil hole of the outer ring is directed toward the free region of the groove of the inner ring, the cage includes a tab positioned at a distance in an axial direction from the guide surface that extends radially inwardly into the groove of the inner ring.

8. The bearing unit according to claim 7, wherein the rolling bearing has a double-row of the rolling bodies and the inner ring is split in the axial direction.

9. A roller bearing comprising:
an outer ring including a spray oil hole,
an inner ring rotatable relative to the outer ring about an axis of rotation, and including a groove with a free region that extends on an outer circumference of the inner ring and a guide track on the outer circumference,
a cage including, on an inner circumference thereof, a guide surface that is guided on the guide track on the inner ring, and
a number of rolling bodies that are guided in the cage between the outer ring and the inner ring,
wherein the groove of the inner ring includes a groove base that rises in a radial direction toward the guide surface of the cage, and the spray oil hole of the outer ring is directed toward the free region of the groove of the inner ring, and the cage includes a tab positioned at a distance in an axial direction from the guide surface that extends radially inwardly into the groove of the inner ring
wherein the cage comprises, on said inner circumference thereof, another guide surface that is guided on another guide track on the outer circumference of the inner ring, and the rolling bodies are guided in the axial direction between the two guide surfaces.

* * * * *